(12) United States Patent
Sauriol et al.

(10) Patent No.: US 7,215,949 B2
(45) Date of Patent: May 8, 2007

(54) CELLULAR SUBSCRIBER RADIO SERVICE (75) Inventors: Nicholas Sauriol, Nepean (CA); Alex Sauriol, Nepean (CA)

(73) Assignee: Nortel Networks Limited, Quebec (CA)

(*) Notice: Subject to any disclaimer, the term of this patent is extended or adjusted under 35 U.S.C. 154(b) by 458 days.

(21) Appl. No.: 10/029,857

(22) Filed: Dec. 31, 2001

(65) Prior Publication Data

US 2002/0090936 A1 Jul. 11, 2002

Related U.S. Application Data (63) Continuation-in-part of application No. 09/749,430, filed on Dec. 28, 2000.

(51) Int. Cl.
*H04Q 7/20* (2006.01)

(52) U.S. Cl. ............... 455/418; 455/419; 455/420; 455/3.06; 455/3.01; 455/41.1; 455/445; 455/344; 381/302

(58) Field of Classification Search ............ 455/418, 455/419, 420, 344, 345, 414.1, 414.3, 414.4, 455/412.1, 412.2, 403, 456.1, 1, 456.3, 550.1, 455/3.06, 422.1, 41.1, 41.2, 41.3, 66.1, 88, 455/556.1, 557, 575.1, 575.9, 569.1, 569.2, 455/90.3, 128, 347, 350, 351, 500, 517, 445, 455/3.01; 381/345, 302

See application file for complete search history.

(56) References Cited

U.S. PATENT DOCUMENTS

| | | | | |
|---|---|---|---|---|
| 4,435,845 A | * | 3/1984 | Timm et al. ............... | 455/228 |
| 5,990,928 A | * | 11/1999 | Sklar et al. ............... | 725/72 |
| 6,462,646 B2 | * | 10/2002 | Helferich .................. | 340/7.21 |
| 6,728,531 B1 | * | 4/2004 | Lee et al. .................. | 455/419 |
| 7,116,939 B1 | * | 10/2006 | Kandler et al. ............ | 455/41.3 |
| 2002/0103003 A1 | * | 8/2002 | Mauro ....................... | 455/552 |
| 2002/0132575 A1 | * | 9/2002 | Kesling et al. ............ | 455/2.01 |

* cited by examiner

*Primary Examiner*—Keith Ferguson
(74) *Attorney, Agent, or Firm*—Hunton & Williams LLP (57) ABSTRACT A method for retransmitting a received radio programming signal is disclosed. The method comprises the steps of: receiving the signal over a cellular transmission network at a first transceiver station configured to output the radio programming signal; and transmitting the signal from the first transceiver station to at least a second transceiver station configured to output the radio programming signal.

25 Claims, 6 Drawing Sheets

CELLULAR SUBSCRIBER RADIO SERVICE

CROSS-REFERENCE TO RELATED APPLICATIONS

This is a continuation-in-part of co-pending U.S. patent application Ser. No. 09/749,430, filed Dec. 28, 2000, incorporated herein by reference in its entirety.

FIELD OF THE INVENTION

The present invention relates to a system and method for receiving broadcast radio programming over a cellular transmission network. In particular, the invention relates to a system and method for receiving broadcast radio programming in a digital format over an interconnected computer network, such as the Internet, and a cellular transmission network.

BACKGROUND OF THE INVENTION

In existing systems radio programming is traditionally broadcast from transmitters designed to cover a relatively large, but finite, geographic area. Receivers outside of the geographic area are not able to receive the radio programming. This is a disadvantage for listeners, who are unable to receive the programming, and for advertisers, who are unable to reach markets beyond the broadcast area.

In addition, providing digital radio programming is expensive. For example, digital radio broadcast requires expensive new equipment as there is no existing infrastructure for digital radio broadcast. In addition, current systems do not allow for new methods of generating income. Existing systems do not provide enough revenue to warrant the expense of providing digital radio broadcasts.

Another drawback of existing systems is that current radio systems are restricted to very localized transmissions because of, among other things, the limitations on broadcast bandwidth. This limits the number of radio stations that can broadcast in any given geographic region.

SUMMARY OF THE INVENTION

The invention provides, in one aspect, a receiver for receiving a radio programming signal broadcast over a cellular transmission network. The receiver comprises an input for receiving the radio programming signal, an audio output for delivering an audible portion of the radio programming signal, and a processor means for processing the radio programming signal.

In another aspect, the invention includes a method for retransmitting a received radio programming signal. The method comprises the step of receiving the signal over a cellular transmission network at a first transceiver station. Next, the signal is transmitted from the first transceiver station to a second transceiver station.

The invention enables reception of radio programming in regions outside the normal range of traditional radio broadcast. For example, a radio program listener in Canada may wish to listen to radio programming from Brazil. Ordinarily, the listener would not be able to receive the programming because his location in Canada is far outside the broadcast range of the Brazilian radio station. Embodiments of the present invention enable the Canadian listener to receive the Brazilian program in the following manner. First the Brazilian radio program is uploaded in a digital format onto a processor based network (e.g., the Internet). A cellular radio provider may then access the programming via the internet and forward the programming to a cellular transmission system. The listener in Canada then receives the Brazilian radio program from the cellular transmission network anywhere in the coverage area of the cellular network.

Another feature of the present invention is the ability for radio programming providers to sell advertising space on their programs. In some embodiments, the cellular transmission network may provide transmission of advertising along with the radio programming. For example, cellular receivers with visual display screens may be implemented to receive images, text, or other visual displays that are displayed during the transmission of the radio program.

Another feature of the invention is the ability to reduce the costs of supplying digital radio programming. For example, by taking advantage of the cellular transmission paradigm, embodiments of the invention enable multiple radio programs to be multiplexed and transmitted over a relatively few frequencies. Thus, reducing the bandwidth and power requirements for the transmission.

In addition, because cellular transmissions are individualized (i.e., sent to an identified receiver) the radio programming may be customized to the receiver. For example, the listener may select from a menu of radio programming (e.g., sports programs, different type of music programs, news programs, financial reports, etc.). In addition, cellular radio providers may implement billing schemes that are similarly customized (e.g., pay-per-program, basic program rates, premium program rates, free program minutes, etc.). Likewise, advertising may be customized according to the receiver (e.g., based upon listener selection, listener past purchasing history, listener programming selections, etc.). Of course, cellular radio providers may also sell advertising space according to customized schemes.

In some embodiments, other schemes for producing revenue are possible. For example, cellular radio providers may charge a fee for the transmission of data. In some embodiments, transmitted data may include news information, weather reports, stock market prices, sporting event scores, and other information. The transmitted data may be viewed on a display screen, played back as an audible signal, or otherwise received by the listener.

Some embodiments of the invention may also enable access to the Internet. Internet access may be enabled through a wireless connection scheme provided on the receiver.

These and other embodiments of the present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

DETAILED DESCRIPTION OF THE FIGURES

Figure 1:
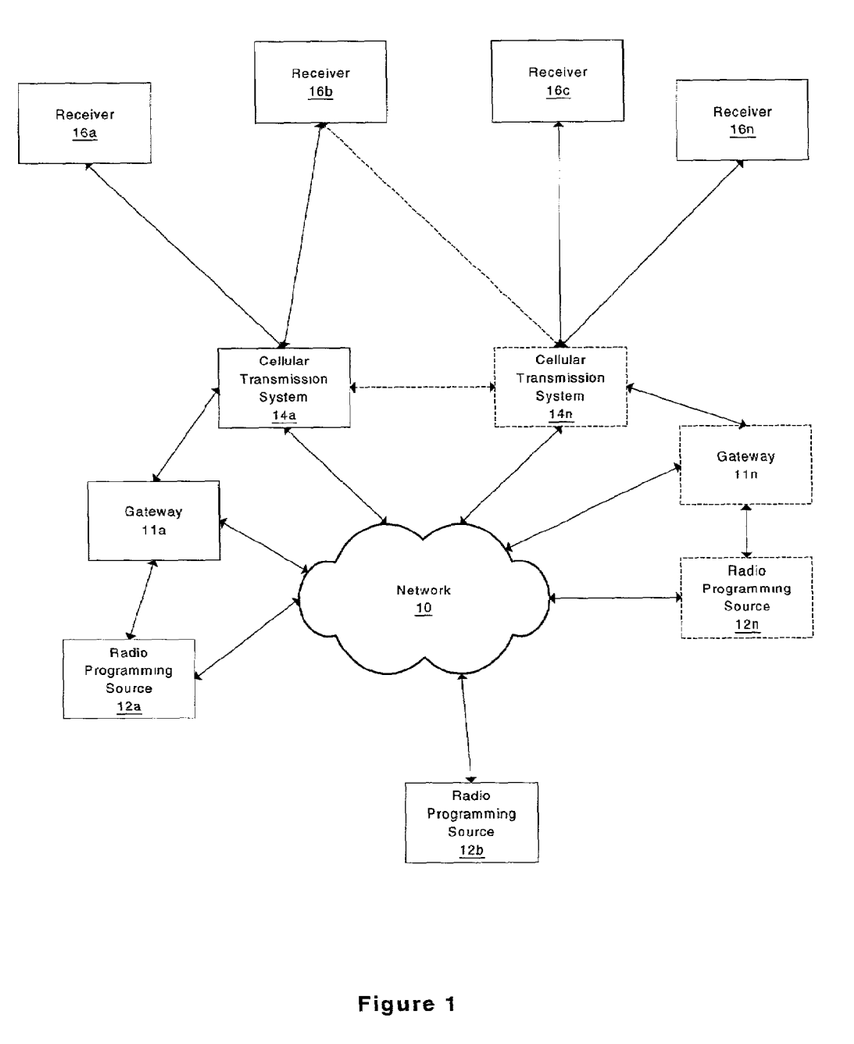
FIG. 1 is a schematic representation of the overall system according to one embodiment of the invention.

FIG. 1 shows a schematic illustration of one embodiment of the overall cellular radio program transmission system. As shown, the radio programs that are broadcast may originate from any suitable radio programming source (e.g., radio programming source 12a, 12b, . . . , 12n). As shown in FIG. 1, the system may comprise multiple radio programming sources 12a–12n. The radio programming sources 12a–12n, may be traditional over-the-air radio stations that broadcast in the FM, AM, short wave, or other frequency bands.

In some embodiments, radio programming sources 12a–12n may comprise other sources of digital radio programming. For example, radio programming sources 12a–12n may comprise music, news, sports, financial information, weather reports, talk-shows, comedy programs or other radio programming stored on a computer or other processor based device such as an MP3 server.

Other sources of radio programming are possible. For example, emergency broadcasts, traffic reports, governmental broadcasts, or the like, may be transmitted over a cellular radio system. In addition, conference centers, hotels, transit stations, or the like may broadcast information over a digital cellular radio system.

In some embodiments, a broadcast gateway 11a–11n may be provided as an interface between the radio programming source (e.g., 12a–12n) and the end user (e.g., receiver 16a–16n). For example, gateway 11a–11n may serve as an access device for enabling the radio programming to be accessible over a processor based network (e.g., network 10). For example, broadcast gateway 11a–11n may provide an Internet input interface for broadcast content. In some embodiments, gateway 11a–11n may compress and encodes the content delivering it via existing digital cellular base station equipment (e.g., transmission system 14a–14n). In addition, gateway 11a–11n may comprise additional inputs that enable the receipt, transmission, routing, and other handling of other network transmission signals. For example, gateway 11a–11n may comprise inputs to process cellular telephone signals. Gateway 11a–11n may also provide billing capabilities.

As shown in FIG. 1, the sources of radio programming 12a–12n may also be in communication with network 10. Network 10 may comprise any suitable processor based network capable of serving the files associated with the radio programming. For example, network 10 may comprise, the Internet, a Wide Area Network (WAN), a Local Area Network (LAN), an intranet, a wireless network, or other network configuration.

Also in communication with network 10 are cellular transmission systems 14a–14n. As shown, network 10 may communicate with multiple cellular transmission systems 14a, . . . , 14n. In addition, cellular transmission systems 14a–14n may communicate with each other or gateway 11a–11n to coordinate delivery of transmission data. Cellular transmission systems 14a–14n represent the systems that enable the cellular transmissions to be appropriately routed, switched and broadcast to the intended recipients. For example, cellular transmission systems 14a–14n may comprise the routers, switches, antennas, transmitters, software, and other devices used to implement a cellular transmission.

Cellular transmission systems 14a–14n deliver the transmission to the designated receiver 16a–16n. Receiver 16a–16n may comprise any device capable of receiving cellular transmissions. For example, receiver 16a–16n may comprise a cellular telephone. In some embodiments, receiver 16a–16n may comprise a cellular radio one example of which is shown in FIG. 2.

Figure 2:
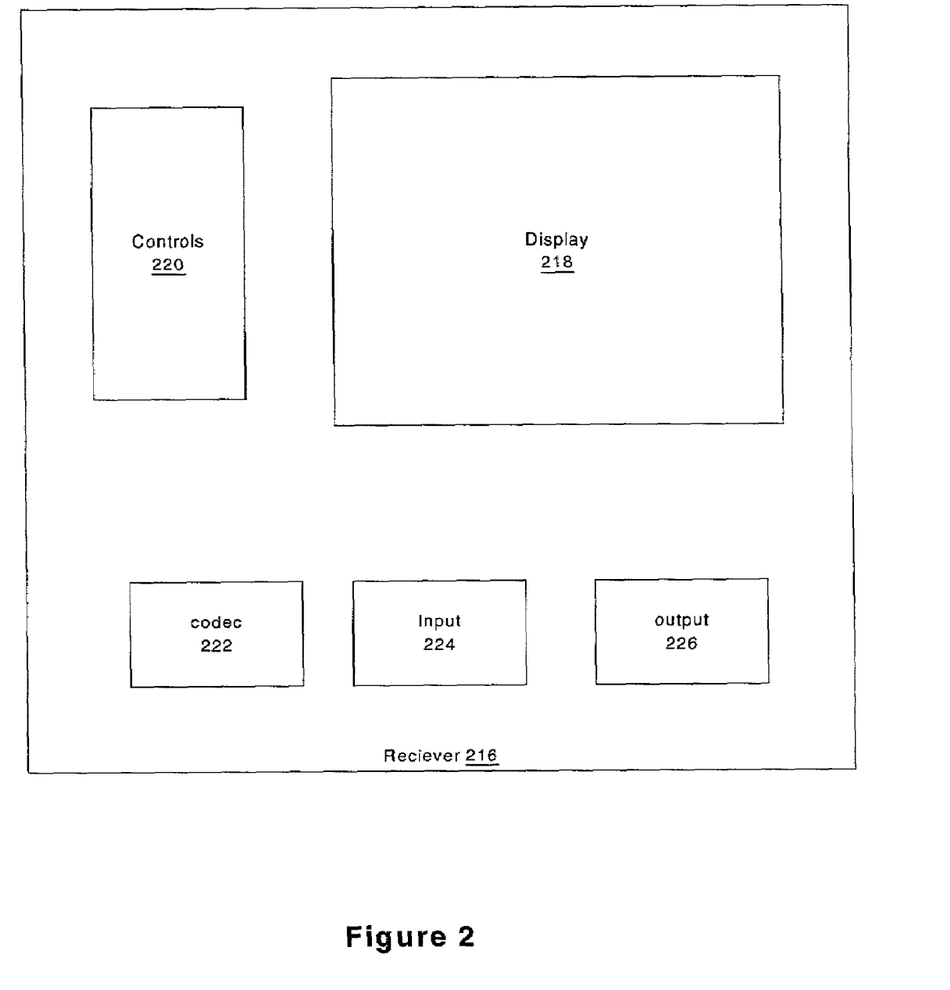
FIG. 2 is a schematic representation of a receiver according to one embodiment of the invention.

FIG. 2 shows a cellular receiver 216 according to one embodiment of the invention. As shown, receiver 216 may comprise a display 218 and controls 220. Display 218 may comprise any form of device capable of showing a visual display. For example, display 218 may comprise a liquid crystal display (LCD) screen, an active matrix display screen, a cathode ray tube (CRT) or any other suitable display device.

In some embodiments, cellular receiver 216 may decode and decompress (e.g., with CODEC 222) the broadcast stream of programming. CODEC 222 may provide a digital audio output 226 for programming content and a digital stream output for non-audio broadcast content (e.g., display 216). The cellular receiver 216 may also provide an input 224 for stream configuration, allowing, for example, the selection, or tuning, of content. Input 224 may also be used for general operational configuration.

As noted above, display 218 may be implemented to display visual images along with the cellular radio transmission. For example, display 218 may be used to display advertising, text, images, graphics, financial information (e.g., stock market activity), sports information (e.g., scores), and other visual information.

Receiver 216 may also include controls 220. Controls 220 provide a user interface to enable controlling the receipt and playback of the cellular transmissions. For example, controls 220 may comprise volume, channel, power, preset stations, number dialing keys, image display controls, audio playback controls, and the like.

Receiver 216 may also comprise a suitable decoder to ensure, among other things, that only the intended receiver 216 receives the programming. For example, the programming may be encoded so that pirating, or unintentional reception of the transmission can be avoided. In addition, a decoder may ensure that received programming can be adequately tracked and billed to the listener.

Figure 3:
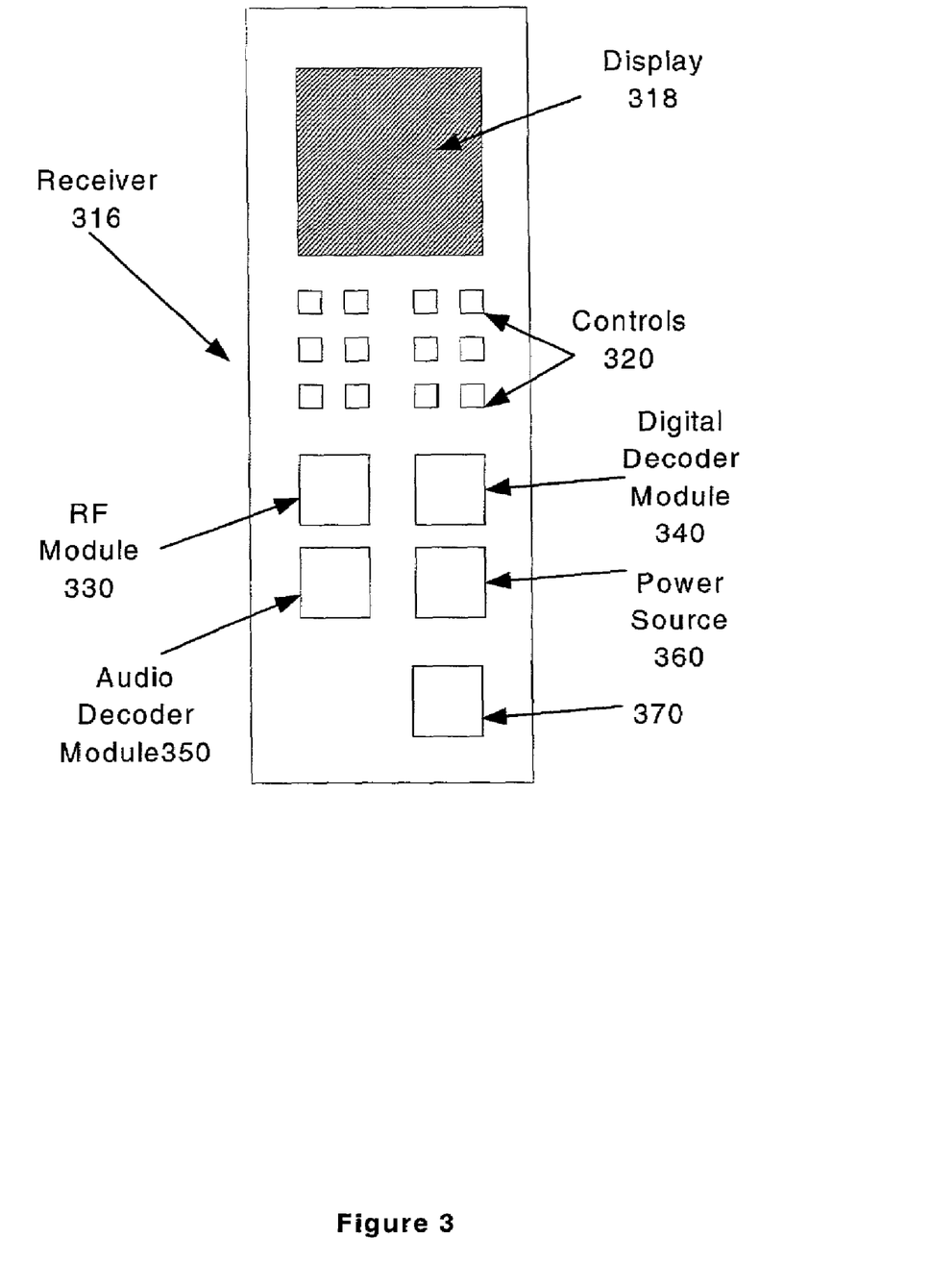
FIG. 3 is a schematic representation of a receiver according to another embodiment of the invention.

FIG. 3 is a schematic representation of another hand-held receiver 316 for receiving a transmission from the cellular transmission systems 14a–14n, according to an embodiment of the invention. As shown, hand-held receiver 316 may comprise a display 318 and an array of controls 320. Display 318 may comprise any form of device capable of showing a visual display, including, for instance, a liquid crystal display (LCD) screen, an active matrix display screen, a cathode ray tube (CRT) or any other suitable display device. The display 318 may be implemented to display visual images along with the cellular radio transmission. For example, display 318 may be used to display advertising, text, images, graphics, financial information (e.g., stock market activity), sports information (e.g., scores), and other visual information.

The array of controls 320 may provide a user interface to enable controlling the receipt and playback of the cellular transmissions. For example, controls 320 may comprise volume, channel, power, preset stations, number dialing keys, image display controls, audio playback controls, and the like. According to one embodiment, controls 320 may comprise the keypad of a standard cellular telephone.

In an embodiment of the invention, a user with hand-held receiver 316 may receive a radio broadcast program by using the array of controls 320 to dial a designated number. The number may, for example, comprise a conventional 10-digit telephone number. The service provider may designate a separate number for each channel of the cellular transmission system used to broadcast a radio program. In this regard, a subscriber would be able to dial whichever number corresponded to the particular programming that he or she desired to receive. Alternatively, as described above, the service provider may multiplex one or more radio programs over a single control channel. In such an instance, a subscriber may use receiver 316 to dial one number, and then select the radio program that they would like to receive by selecting from a menu of options that may be presented.

To receive radio program broadcasts transmitted form the service provider, hand-held receiver 316 may comprise one or more modules. In one embodiment, for example, receiver 316 may comprise an RF module 330. RF module 330 may function to receive and process incoming signals from the service provider, as well as transmit outgoing signals or re-transmit signals received from the service provider. In another embodiment, receiver 316 may further comprise a digital decoder module 340 for decoding, among other things, video digital signals that may be broadcast by the service provider. For example, the broadcast signal may include digital data that may be displayed on display 318. Lastly, receiver 316 may further comprise an audio decoder module 350 for specifically decoding audio signals, digital or otherwise, that may be broadcast by the service provider. Hand-held receiver 316 may also include a power source 360. Power source 360, may comprise, for example, one or more batteries or an AC adapter.

According to one embodiment, hand-held receiver 316 may also include additional functionality 370. As shown in more detail in FIG. 3a, receiver 316 may include memory 375 for increasing and enhancing the functionality of receiver 316. In one embodiment, memory 375 may comprise Random Access Memory, or RAM, for running software that processes data and voice signals, and for buffering streaming or persistent data. In another embodiment, memory 375 may comprise persistent memory for storing data, including voice data, software, codes, etc. Receiver 316 may also include a processor 380 for running software and handling all signal processing, including voice, audio, and data processing.

Figure 3A:
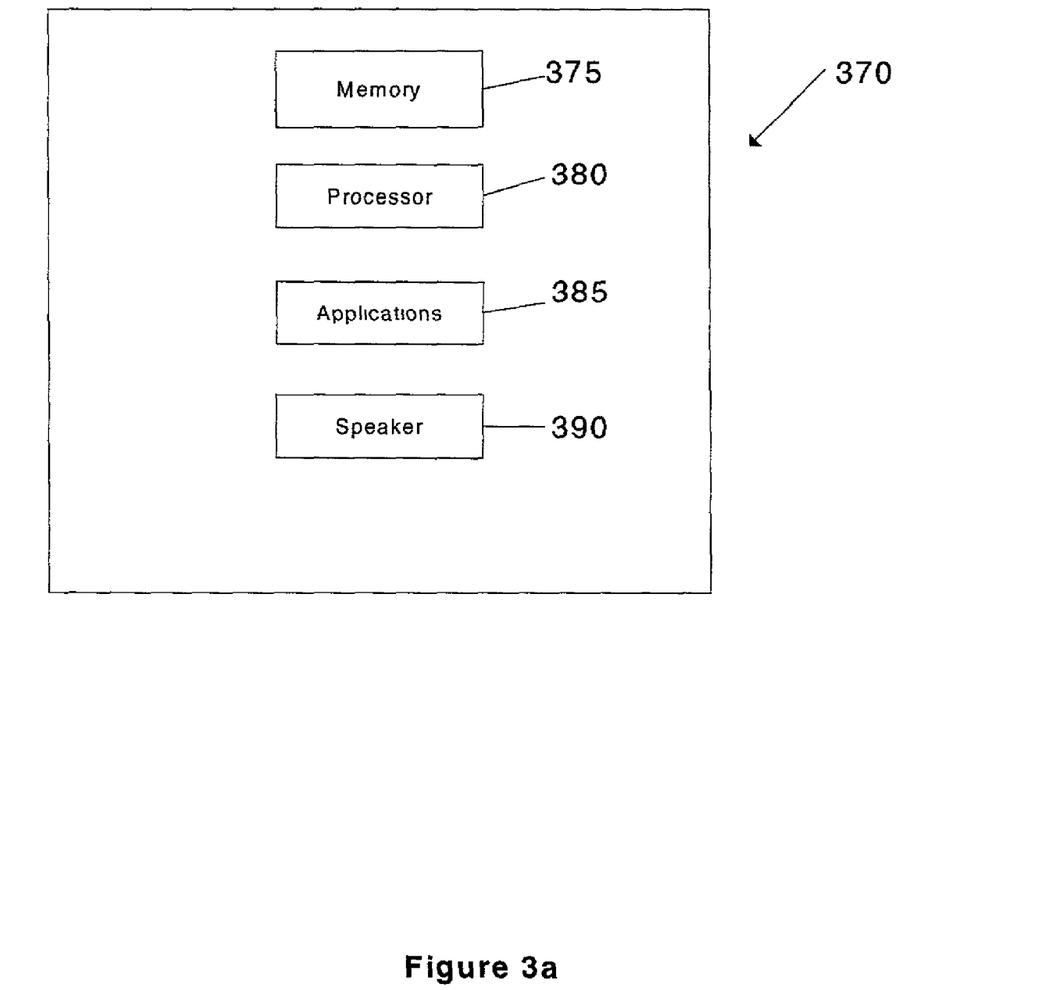
FIG. 3a is a schematic representation of additional components of the receiver shown in FIG. 2 according to one embodiment of the invention.

Receiver 316 may also include software, or applications 385, supporting playback of different audio formats such as MP3 and WAV. Other formats may of course be accommodated. In one embodiment the software may be configured to query the server (of the service provider for example) for data and to request data. The software may also schedule recording of signals or data to memory 375, as configured by the end-user. For example, the end-user may program receiver 316 to record the news which plays at 17:30 for 5 minutes. This way, the end-user is able to play back the news at a more convenient time. In another example, the software may be able to accept input to be displayed on display 318, such as graphical/textual news or weather, for example.

Lastly, receiver 316 may also include an enhanced listening device 390 such as a speaker(s) capable of supporting high quality playback or audio (CD quality, for example). In another embodiment, receiver 316 may provide a headset jack (not shown) enabling the end-user to enjoy enhanced audio in a more private manner.

Figure 4:
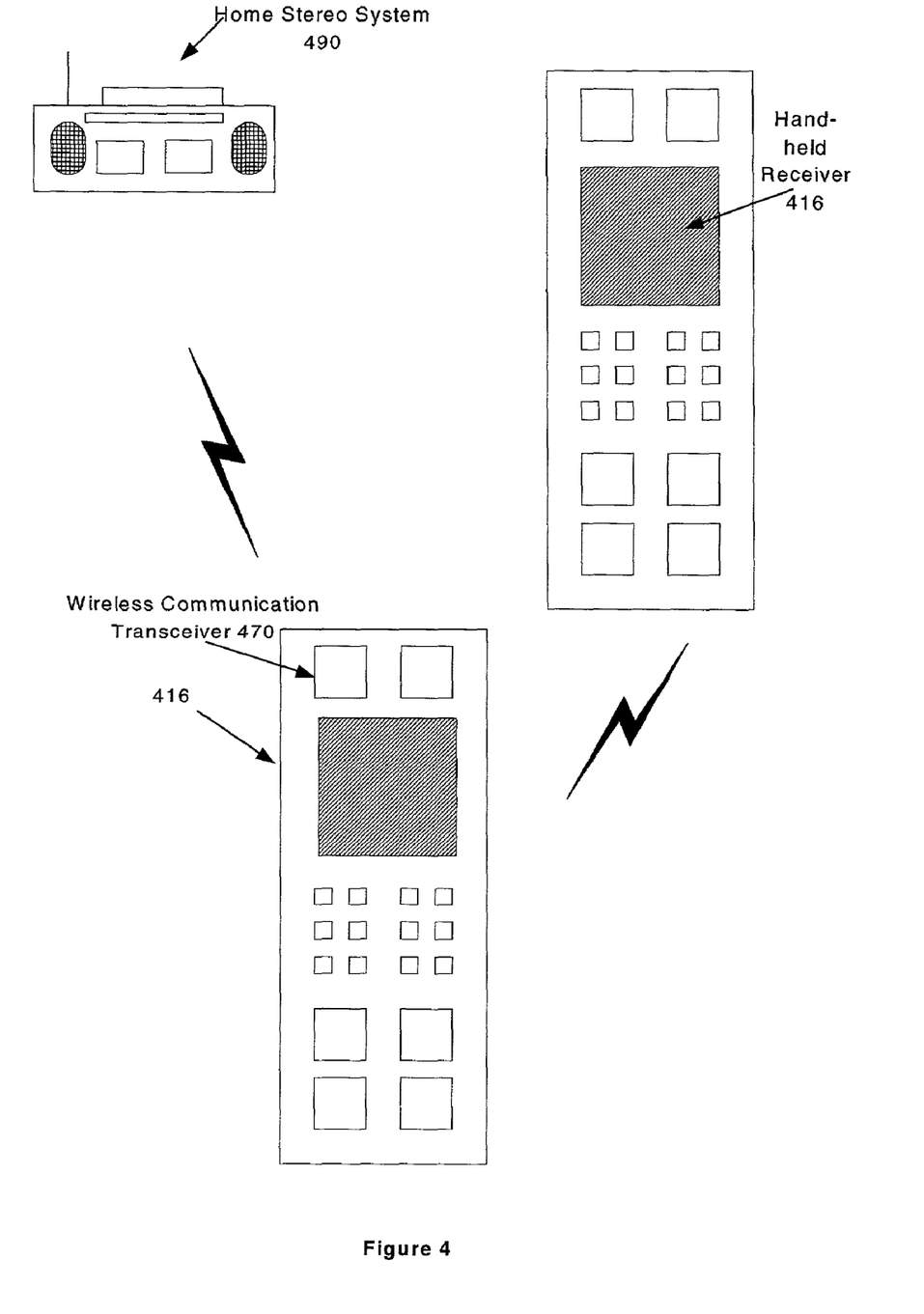
FIG. 4 is a schematic representation of a receiver able to wirelessly transmit and receive data according to one embodiment of the invention.

FIG. 4 illustrates an embodiment of the invention in which a hand-held receiver 416 may further comprise a wireless communication transceiver 470 that operates to wirelessly transmit and receive data and other information. Wireless communication transceiver 470 may comprise a transceiver operative to communicate using any suitable wireless transmission protocol. In one embodiment, wireless communication transceiver 470 may provide an IR (infrared) link, allowing the hand-held receiver 416 to transmit radio programming received via the cellular transmission system to a second device configured to receive the IR transmission. This may allow, for example, a subscriber to listen to radio programming using a home stereo system 490 or car stereo system (not shown), or other similar device. In another embodiment, transceiver 470 may transmit the signal or data to another like transceiver.

This may be particularly advantageous when the home stereo system 490 is capable of receiving radio programming in a limited geographic area via a traditional over-the-air radio station broadcasting in the FM, AM, short wave, or other frequency band. A subscriber may first use the hand-held receiver 416 to receive a broadcast from as far away as another country via the cellular transmission system which is receiving the transmission over a processor based network, as described above. The subscriber may then transmit the radio programming over the IR link to the home stereo system 490 for a more pleasant listening experience. In another embodiment, the received signal may be further processed prior to being transmitted over the IR link. For example, the received signal may be modified, edited, enhanced, etc. prior to being transmitted. Other types of processing may be possible.

In an embodiment, wireless communication transceiver 470 may comprise a Bluetooth™ communication chip. Bluetooth™ is a wireless communication protocol operating in the unlicensed ISM band at 2.4 GHz that enables wireless communication of data and voice. The Bluetooth™ system operates through a collection of short-range radio links, built into 9×9 mm microchips, i.e., Bluetooth™ chips. The short-range radio links enable ad hoc groupings of connected devices away from fixed network infrastructures. Bluetooth™ supports an synchronous data channel, up to three simultaneous synchronous voice channels, or a channel which simultaneously supports asynchronous data and synchronous voice. By using a Bluetooth™ chip, hand-held receiver 416 may transmit or receive radio programming from other devices also using a Bluetooth™ chip, such as, for example, a second hand-held receiver 416b.

Figure 5:
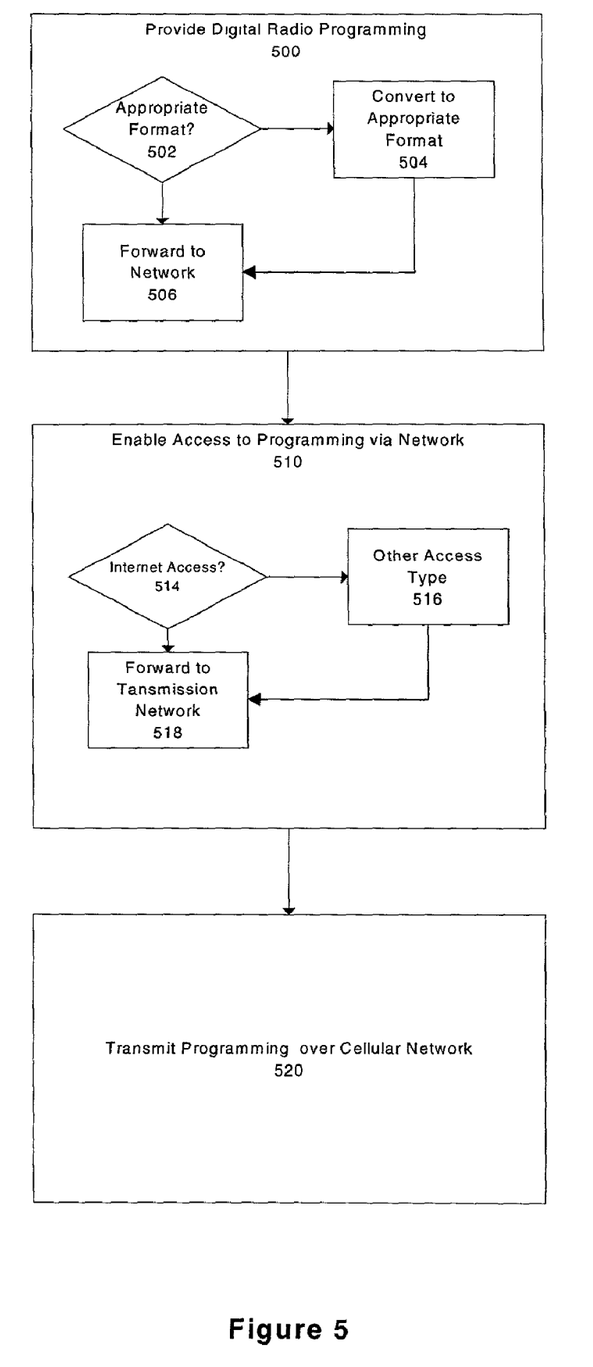
FIG. 5 is a flow diagram illustrating a method of implementing cellular radio according to one embodiment of the invention.

FIG. 5 is a representation of a method for cellular transmission according to one embodiment of the invention. In one embodiment the process may initiate with providing a source of radio programming at step 500. As shown in the Figure, step 500 may comprise a number of sub-steps. For example, a verification of whether the radio programming is in the proper format may be made at step 502. If the format is not proper, it may be converted at step 504. For example, the programming may be converted to a digital format. If the programming is already in the proper format at step 502, or after conversion to the proper format at step 504, the programming may be forwarded to the network (e.g., network 10) at step 506. Forwarding to the network may comprise any procedure that enables the programming to be made available over the network. For example, the programming may be stored in a digital format on a server that is accessible over a network.

Access to the programming via the network is enabled at step 510. As indicated, step 510 may comprise a number of sub-steps. For example, a determination of whether Internet (or other network) access of the programming is possible may be made at step 514. Internet access may comprise enabling downloading of the programming to a transmission network server or other device. If Internet access is not present, the existence of other types of access may be investigated at step 516. Other types of access may include access to stored programming on an Motion Picture Experts Group, Audio Layer 3 (MP3) server or other device.

If it is determined that Internet (or other network) access is available at step 518, or after other type of access at step 516, the accessed programming may be forwarded to a transmission network (e.g., cellular transmission system 14a–14n) at step 518. Forwarding to a transmission network may include any mechanisms that make the programming available for transmission over the cellular network. For example, the programming may be up-loaded onto a transmission system server or other device.

At step 520 the programming may be transmitted over the cellular network. Transmission may comprise any steps suitable for enabling transmission of the programming to a cellular receiver.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A receiver for receiving a radio programming signal broadcast over a cellular transmission network, the receiver comprising:
    an input for receiving the radio programming signal;
    an audio output for delivering an audible portion of the radio programming signal;
    transmission means for transmitting the radio programming signal to a second receiver configured to: (1) deliver an audible portion of the radio programming signal, and (2) retransmit the radio programming signal; and
    processor means for processing the radio programming signal.

2. The receiver of claim 1 wherein the processor means comprises an RF module for processing and re-transmitting the radio broadcast signal.

3. The receiver of claim 1 wherein the processor means comprises a digital decoder module for decoding and processing digital signals embedded in the radio programming signal.

4. The receiver of claim 1 wherein the processor means comprises an audio decoder module for decoding and processing audio signals embedded in the radio programming signal.

5. The receiver of claim 1 further comprising a memory means for storing at least a portion of the radio programming signal.

6. The receiver of claim 5 wherein the memory means comprises Random Access Memory (RAM) for buffering data related to the radio programming signal.

7. The receiver of claim 5 wherein the memory means comprises persistent memory for storing data and voice data related to the radio programming signal.

8. The receiver of claim 1 wherein the processor means further comprises a processor for running software and for voice processing.

9. The receiver of claim 1 further comprising software supporting the playback of audio formats such as MP3 and WAV.

10. The receiver of claim 1 further comprising a video output for delivering a video portion of the radio programming signal.

11. The receiver of claim 1 wherein the input receives the radio programming signal over the cellular transmission network.

12. The receiver of claim 1 wherein the transmission means transmits the radio programming signal wirelessly.

13. A method for retransmitting a received radio programming signal, comprising the steps of:
    receiving the signal over a cellular transmission network at a first transceiver station configured to output the radio programming signal; and
    transmitting the signal from the first transceiver station to at least a second transceiver station configured to output the radio programming signal.

14. The method of claim 13 further comprising the step of processing the signal at the first transceiver station prior to retransmitting.

15. The method of claim 13 wherein the second transceiver station comprises a stereo system.

16. The method of claim 13 wherein the second transceiver station comprises a car radio.

17. The method of claim 13 wherein the first transceiver station further comprises an infrared link.

18. The method of claim 13 wherein the radio programming signal is transmitted to the cellular transmission network by a radio programming source through a data network or gateway.

19. A system for receiving and transmitting a radio programming signal over a cellular transmission network, comprising:
    input means for receiving the radio programming signal;
    output means for delivering the radio programming signal;
    transmission means for transmitting the radio programming signal to at least one device configured to: (1) deliver the radio programming signal, and (2) retransmit the radio programming signal; and
    processing means for processing the radio programming signal.

20. The system of claim 19 wherein the transmission means comprises an RF module.

21. The system of claim 19 wherein the transmission means comprises an infrared link.

22. The system of claim 19 wherein the processor means comprises a processor.

23. The system of claim 19 wherein the processor means further comprises software supporting the playback of audio formats such as MP3 and WAV.

24. The system of claim 19 wherein the input receives the radio programming signal over the cellular transmission network.

25. The system of claim 19 wherein the transmission means transmits the radio programming signal wirelessly.

* * * * *